US012573269B2

(12) United States Patent
Kumita et al.

(10) Patent No.: US 12,573,269 B2
(45) Date of Patent: Mar. 10, 2026

(54) INFORMATION PROCESSOR AND GAME CONTROL METHOD

(71) Applicant: Universal Entertainment Corporation, Tokyo (JP)

(72) Inventors: Atsushi Kumita, Tokyo (JP); Toshikazu Jinnouchi, Tokyo (JP); Muneki Shiraishi, Tokyo (JP); Satoko Baba, Tokyo (JP); Nobuyuki Kawarai, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 300 days.

(21) Appl. No.: 17/800,275

(22) PCT Filed: Dec. 3, 2020

(86) PCT No.: PCT/JP2020/044996

§ 371 (c)(1),
(2) Date: Aug. 17, 2022

(87) PCT Pub. No.: WO2021/166371

PCT Pub. Date: Aug. 26, 2021

(65) Prior Publication Data

US 2023/0127359 A1 Apr. 27, 2023

(30) Foreign Application Priority Data

Feb. 19, 2020 (JP) ................................ 2020-026590

(51) Int. Cl.
*G07F 17/32* (2006.01)

(52) U.S. Cl.
CPC ...... *G07F 17/3267* (2013.01); *G07F 17/3211* (2013.01)

(58) Field of Classification Search
CPC ......................... G07F 17/3267; G07F 17/3211
See application file for complete search history.

(56) References Cited

U.S. PATENT DOCUMENTS

2009/0233691 A1* 9/2009 Yoshizawa ............. G07F 17/32 463/20
2010/0048287 A1* 2/2010 Yoshizawa ............. G07F 17/32 463/20
2011/0021261 A1* 1/2011 Kadode .................. G07F 17/34 463/20

(Continued)

*Primary Examiner* — Malina D. Blaise
(74) *Attorney, Agent, or Firm* — LEX IP MEISTER, PLLC

(57) ABSTRACT

An information processor includes: a display device which is able to display symbols including at least one first symbol and at least one second symbol and which is configured to display an area in which columns and stages are arranged; and a controller programmed to execute processes (1a) to (1c) as a unit game. The controller is programmed to execute: (1a) a process of randomly determining symbols; (1b) a process of displaying the determined symbols in the area; (1c) a process of awarding a payout; (1d) a process of fix-displaying the at least one second symbol in one or more the columns, the number of the one or more of the columns corresponding to the number of first symbols displayed in the area; and (1e) a process of performing next execution of the unit game by using the area in which the at least one second symbol is fix-displayed.

10 Claims, 10 Drawing Sheets

(56) References Cited

U.S. PATENT DOCUMENTS

| | | | | |
|---|---|---|---|---|
| 2011/0118003 | A1* | 5/2011 | Nakamura | G07F 17/3267 463/20 |
| 2013/0157741 | A1* | 6/2013 | Pacey | G07F 17/3265 463/20 |
| 2016/0093146 | A1* | 3/2016 | Kitamura | G07F 17/3258 463/20 |
| 2017/0032611 | A1* | 2/2017 | Luong | G07F 17/3258 |
| 2017/0169665 | A1* | 6/2017 | St. John | G07F 17/3209 |
| 2017/0301177 | A1* | 10/2017 | Pawloski | G07F 17/3244 |
| 2018/0047248 | A1* | 2/2018 | Mizue | G07F 17/34 |
| 2018/0225926 | A1* | 8/2018 | Wortmann | G07F 17/3267 |
| 2019/0295376 | A1* | 9/2019 | Ludwick | G07F 17/34 |
| 2020/0051381 | A1* | 2/2020 | Tam | G07F 17/34 |
| 2020/0118382 | A1* | 4/2020 | Hendricks | G07F 17/32 |
| 2021/0142622 | A1* | 5/2021 | Sanborn | G07F 17/34 |
| 2022/0375306 | A1* | 11/2022 | Slomiany | G07F 17/3267 |
| 2023/0097046 | A1* | 3/2023 | Dhaliwal | G07F 17/3213 463/20 |
| 2023/0107076 | A1* | 4/2023 | Crow | G07F 17/3267 463/20 |
| 2025/0005995 | A1* | 1/2025 | Boese | G07F 17/34 |

* cited by examiner

INFORMATION PROCESSOR AND GAME CONTROL METHOD

TECHNICAL FIELD

The present invention relates to an information processor and a game control method.

BACKGROUND

In a known stationary gaming machine and more recently in a known smartphone in which game application software is installed, a game advances in response to a player's operation of an operation panel or a touch panel of a smartphone. For example, there is a slot game which is arranged such that a benefit (payout) is awarded in accordance with a combination of symbols displayed on a screen (i.e., a game result).

In such a slot game, when a result of a normal game satisfies a predetermined condition, the game may shift to a special game (bonus game) which is different from the normal game (see Patent Literature 1 and Patent Literature 2).

For example, in a slot game of Patent Literature 1, when (i) a symbol group is scrolled and displayed and (ii) some symbols stopped and displayed on a screen form a predetermined combination, a bonus game using another symbol group is executed. In the another symbol group, the some symbols stopped and displayed on the screen are changed into specific symbols are advantageous for a player.

CITATION LIST

Patent Literatures

[Patent Literature 1] Specification of Publication of U.S. Patent Application No. 2008/200235

[Patent Literature 2] Japanese Unexamined Patent Publication No. 2009-201986

SUMMARY OF THE INVENTION

Technical Problem

However, in Patent Literature 1, only some of all symbols belonging to a symbol group which is scrolled and displayed in the bonus game are changed into the specific symbols. In other words, the specific symbols are not necessarily stopped and displayed. Therefore, when the game shifts to the bonus game, the player may have difficulty in recognizing whether a situation changes into an advantageous situation.

An object of the present invention is to provide an information processor which makes it possible to solve the above-described problem.

Solution to Problem

The present invention relates to an information processor comprising: a display device which is able to display symbols including at least one first symbol and at least one second symbol and which is configured to display a symbol display area in which columns and stages are arranged to intersect with one another in a matrix manner; and a controller programmed to execute processes (1a) to (1c) as a unit game, the controller being programmed to execute:

(1a) a symbol random determination process of randomly determining symbols displayed in the symbol display area;

(1b) a process of displaying the symbols, which are determined by the symbol random determination process, in the symbol display area;

(1c) a process of awarding a payout in accordance with a combination of the symbols, which are displayed in the symbol display area, after the process (1b);

(1d) a process of fix-displaying the at least one second symbol in one or more of the columns of the symbol display area, the number of the one or more of the columns corresponding to the number of first symbols displayed in the symbol display area by the process (1b); and (1e) a process of performing next execution of the unit game by using the symbol display area in which the at least one second symbol is fix-displayed by the process (1d).

With this arrangement, as a result of the random determination, when the at least one first symbol is displayed in the symbol display area in which the columns and the stages are arranged to intersect with one another in the matrix manner, the at least one second symbol is fix-displayed in the one or more of the columns. In this regard, the number of the one or more of the columns corresponds to the number of displayed first symbols. In the next execution of the unit game, while the at least one second symbol is fix-displayed in the one or more of the columns, (i) randomly determined symbols are displayed in other columns and (ii) the payout is awarded in accordance with the combination of the symbols including the at least one second symbol which is fix-displayed in the one or more of the columns.

Therefore, when the at least one first symbol is displayed in the symbol display area, the at least one second symbol is fix-displayed in the one or more of the columns in the next execution of the unit game. This allows a player to easily recognize the increase of probability of achievement of the combination of the symbols including the at least one second symbol.

According to the present invention, in above-described information processor, in the process (1c), the payout may be awarded in accordance with the combination of the symbols which are successively displayed in the columns from one side toward the other side in the symbol display area, and in the process (1d), the at least one second symbol is fix-displayed in the one or more of the columns and the number of the one or more of the columns increases in order from the other side and in accordance with the number of the first symbols displayed in the symbol display area in the process (1b).

With the arrangement above, the number of the one or more of the columns increases from the last one of the columns and in accordance with the number of the first symbols displayed in the symbol display area. The at least one second symbol is fix-displayed in the one or more of the columns. For the last one of the columns, whether to award the payout is determined last among the columns. This regularizes the order of the columns in which the at least one second symbol is fix-displayed, and thus the player is able to easily recognize the order of the columns.

According to the present invention, in the above-described information processor, the controller is programmed to further execute:

(1f) a process of fix-displaying the at least one second symbol in one of the columns of the symbol display area each time a third symbol is displayed in the symbol display area by the process (1b).

With this arrangement, the at least one second symbol can be fix-displayed in the one of the columns also when the third symbol is displayed in the symbol display area.

The present invention relates to a game control method including a process of causing an information processor to execute processes (2a) to (2c) as a unit game, the information processor being able to display symbols including at least one first symbol and at least one second symbol, being configured to display a symbol display area in which columns and stages are arranged to intersect with one another in a matrix manner, and being caused to execute:

(2a) a symbol random determination process of randomly determining symbols displayed in the symbol display area;

(2b) a process of displaying the symbols, which are determined by the symbol random determination process, in the symbol display area;

(2c) a process of awarding a payout in accordance with a combination of the symbols, which are displayed in the symbol display area, after the process (2b);

(2d) a process of fix-displaying the at least one second symbol in one or more of the columns of the symbol display area, the number of the one or more of the columns corresponding to the number of first symbols displayed in the symbol display area by the process (2b); and (2e) a process of performing next execution of the unit game by using the symbol display area in which the at least one second symbol is fix-displayed by the process (2d).

PREFERRED EMBODIMENT OF INVENTION

Embodiment

An information processor and a game control method of the present embodiment will be described with reference to figures.

Figure 1:
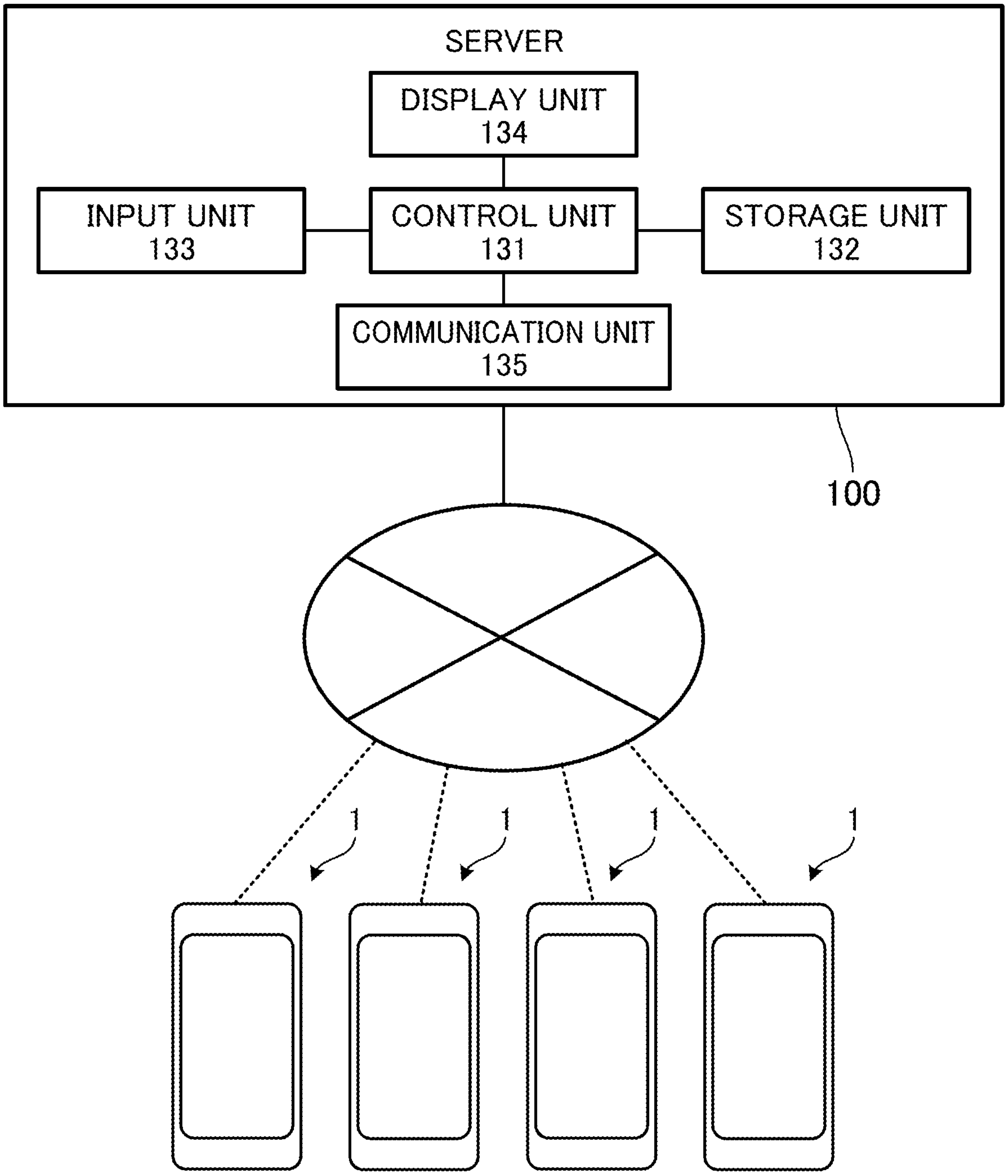
FIG. 1 illustrates a network environment between a server and each smartphone.

In the present embodiment, each smartphone 1 is connected to a server 100 over the Internet (communication line) as shown in FIG. 1. In each smartphone 1, application software downloaded from the server 100, etc. is installed in accordance with the OS (Operating System) of each smartphone 1. In the present embodiment, a slot game is playable as a game element of the application software installed in the smartphone 1. In other words, a player is allowed to play the slot game on this application software. The slot game may be an add-in of the application software. In other words, as an additional function of the application software, the slot game may be provided independently from the application software by a server 10, etc. In the application software, slot games in which effects and rules are different may be playable. The application software may be a web browser.

Figure 2:
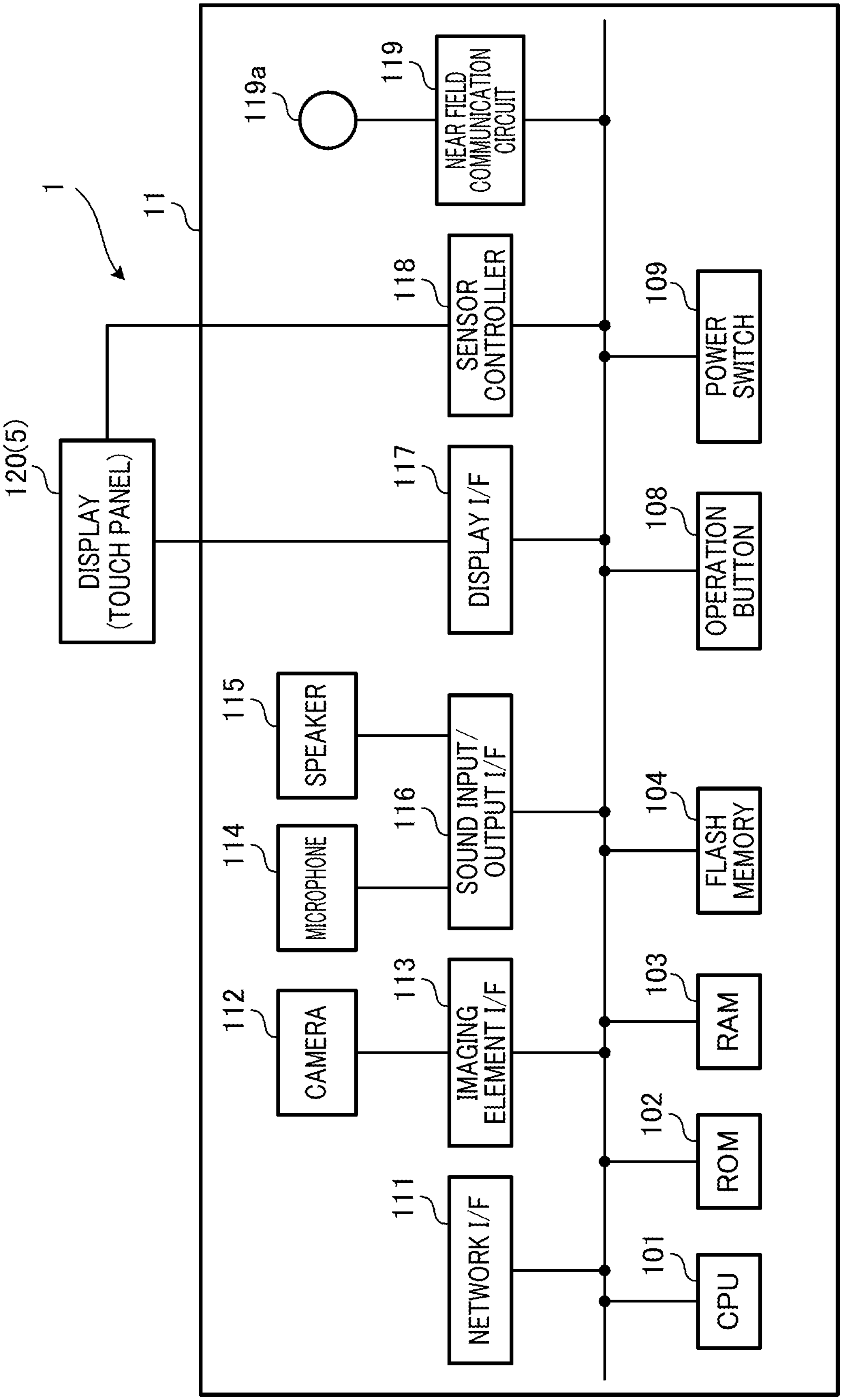
FIG. 2 is a block diagram of the electrical configuration of the smartphone.

In the present embodiment, one smartphone 1 shown in FIG. 1 and FIG. 2 is taken as an example of the information processor. The information processor may be configured to cause at least one of the smartphone 1 and the server 100 to execute a process of realizing the slot game (later-described processes in FIG. 4 to FIG. 6). In other words, the process of realizing the slot game may be independently performed by the smartphone 1, may be independently performed by the server 100, or may be suitably shared and performed by the smartphone 1 and the server 100 in cooperation with each other. In such a case, a combination of the server 100 and the smartphone 1 is regarded as an information processor which is integrally controlled. The processes and actions of the server 100 and the smartphone 1 can be interpreted as those of a game control method, a program, or a system realized between the server 100 and the smartphone 1.

(Online)

The slot game of the present embodiment is run as an online game. Because of this, the server 100 is configured to be accessed by a player with use of, e.g., the smartphone 1 or a PC, to exchange cash (which can be bought by money, a credit card, electronic money, a prepaid card, etc.) owned by the player to coins (credits: gaming media) which are electronic information available in the slot game, and to manage the coins owned by the player.

(Structure of Server 100)

As shown in FIG. 1, the server 100 is a device which is used by an administrator of the slot game, etc. to manage and control the slot game. As the server 100 receives a request or game data from the smartphone 1 operated by the player, the server 100 stores the game data or sends a game program, game data, etc. which can be run on the smartphone 1 to the smartphone 1. The server 100 of the present embodiment includes a control unit 131, a storage unit 132, an input unit 133, a display unit 134, and a communication unit 135.

The control unit 131 (e.g., a CPU: equivalent to a controller) is configured to control the server 100. Furthermore, data is sent and received between the control unit 131, the storage unit 132, the input unit 133, the display unit 134, and the communication unit 135.

The storage unit 132 (which is equivalent to a storage device) is constituted by a ROM (Read Only Memory) storing a system program, a RAM (Random Access Memory) which is a rewritable storage area, a flash memory, etc.

The input unit 133 is a device allowing the administrator or the like to input settings or the like of the slot game and is embodied by, e.g., a keyboard and a mouse.

The display unit 134 is configured to display an operation screen for the administrator, in response to an instruction from the control unit 131.

The communication unit 135 is provided to communicate with the smartphones 1.

(Structure of Smartphone 1)

As shown in FIG. 2, each smartphone 1 includes, in a housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119*a* of the near field communication circuit 119. In the front surface of the housing 11, a display 120 (which is equivalent to a display device) with a touch panel 5 is embedded.

The display 120 (which is equivalent to the display device) is arranged to be able to display images. Examples of the display method of the display 120 include liquid crystal, organic electroluminescence, CRT (Cathode Ray Tube), and plasma.

The CPU (Central Processing Unit: equivalent to the controller) 101 is configured to control the entire smartphone 1. The ROM (Read Only Memory) 102 stores programs used for driving the CPU 101, such as an IPL (Initial Program Loader).

The RAM (Random Access Memory: equivalent to the storage device) 103 is used as a work area of the CPU 101. The flash memory 104 stores application software (program) for running the game of the present embodiment, a communication program, and data such as image data and sound data. The operation button 108 is used for, e.g., initial settings of the smartphone 1. The power switch 109 is used for turning on/off the power source of the smartphone 1.

The network I/F (Interface) 111 is an interface for performing data communications with the server 100, etc. by utilizing a communication network such as the Internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing, under the control of the CPU 101, input and output of a sound signal between the sound input/output I/F 116 and the microphone 114 and between the sound input/output I/F 116 and the speaker 115. The display I/F 117 is a circuit for sending image data to the display 120 under the control of the CPU 101. The sensor controller 118 is a circuit for receiving an input from the touch panel 5 of the display 120. The near field communication circuit 119 is a communication circuit based on NFC (Near Field Communication) (Registered Trademark), Bluetooth (Registered Trademark), or the like. The bus line 110 is an address bus, a data bus, or the like for electrically connecting the components such as the CPU 101.

(Outline of Slot Game)

Figure 3:
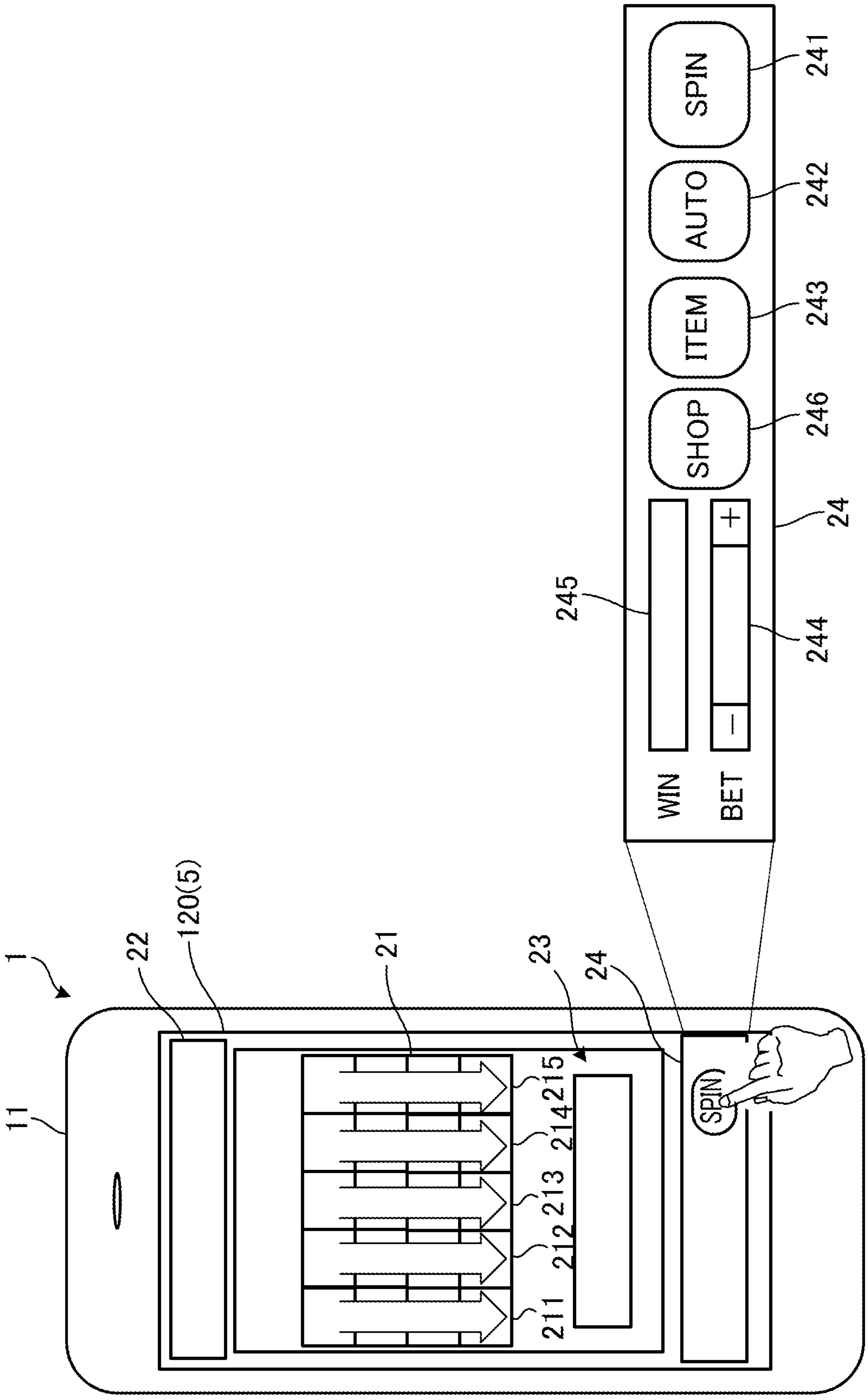
FIG. 3 shows a display state of a slot game on the smartphone.

When the application software of the slot game is executed in the smartphone 1, effects, moving images, and the like of the slot game are displayed on the display 120 of the smartphone 1. Thereafter, the slot game starts upon selection of a selection image indicating the start of the slot game on the touch panel 5. For example, as shown in FIG. 3, when the slot game starts, the slot game in which symbols are rearranged in a symbol display area 21 which is formed of 20 areas forming a matrix with 5 columns and 4 rows becomes executable.

Plural types of slot games may be executable, and the rule, the state of a payout, and effect images may be different depending on which slot game is executed. For example, in a slot game of one type, symbols are rearranged in a symbol display area formed of 9 areas forming a matrix with 3 columns and 3 rows. In this slot game, whether a win is achieved is determined based on a combination of symbols rearranged on a payline set only at the middle stage of the symbol display area (winning determination).

The slot game of the present embodiment is basically started in response to the consumption of a predetermined amount of coins (gaming media) owned by a player. When a predetermined condition is satisfied, the player is able to start the slot game without the consumption of coins. (The predetermined condition is, e.g., a condition of awarding a free game or the slot game is playable without the consumption of coins for a predetermined number of times in a day.)

The coins owned by the player are electronic information. The player accesses the server 100 via the smartphone 1 and exchanges cash to coins in accordance with a payment method specified by a management organization of the slot game. The coins owned by the player are used in various ways. For example, the coins are consumed to obtain an effect influencing on the slot game (as purchase of items), or consumed to change the appearance of an avatar of a player.

The number of coins owned by each player, which is managed by the server 100, is shared between the server 100 and each smartphone 1.

Each gaming medium is not limited to any particular type, and may be electronic money or a game point not including valuable information.

(Slot Game: Definitions)

As shown in FIG. 3, the slot game run in the present embodiment is a game in which (i) symbols are varied in the symbol display area 21 (scrolling moving image of reels) and then stopped (rearranged) and (ii) a benefit (e.g., a payout or an item advantageous for the player) is awarded based on a combination of the symbols displayed in the symbol display area 21. A state in which symbols are displayed after being varied and stopped in the symbol display area 21 is termed “rearrangement (rearrange)”.

A payout awarded based on a combination of symbols displayed in the symbol display area 21 is mainly awarding of coins.

A “unit game” indicates the following serial actions: to randomly determine symbols which are to be rearranged on the symbol display area 21; after the determination, to rearrange the determined symbols in the symbol display area 21; to perform winning determination for a combination of the rearranged symbols (in the present embodiment, a win is determined based on a combination of symbols rearranged on a payline); and, if a win is achieved, to award a payout.

(Slot Game Screen)

A slot game screen displayed on the display 120 of the smartphone 1 will be described.

As shown in FIG. 3, when the slot game is executed, the slot game screen is displayed on the display 120. The slot game screen displays the symbol display area 21 (column 211, column 212, column 213, column 214, and column 215) formed of 20 areas forming a matrix with 5 columns and 4 rows, a game information display area 22 on which information of increment and decrement in accordance with the execution of the slot game (e.g., the number of currently-owned coins) is displayed, an effect display area 23 on which moving and still images and messages related to the game are displayed in accordance with the progress of the slot game, and an operation display area 24 which is operated by the player to progress the slot game. The operation display area 24 includes a spin button 241, an AUTO button 242, an ITEM button 243, a bet button 244, a WIN display portion 245, and a shop button 246.

On the entire surface of the display 120, the touch panel 5 which allows the slot game screen to be viewable from the outside is provided. The touch panel 5 makes it possible to detect the coordinates of a part touched by a player's finger or the like. With this arrangement, for example, the slot game (unit game) is executed once as the image of the spin button 241 is pressed. Furthermore, the slot game can be serially executed plural times as the image of the AUTO button 242 is pressed. When the image of the ITEM button 243 is pressed, the player is able to select and use a previously-obtained item (which exerts an influence in the slot game). As the image of the shop button 246 is pressed, the smartphone 1 accesses the server 100 and the player enters a shop in which cash (which can be bought by money, a credit card, electronic money, a prepaid card, etc. owned by the player) is exchangeable with coins, or cash or coins is/are exchangeable with an item.

(Winning Determination)

In the symbol display area 21, five video reels on which symbols are provided are scrolled, and are rearranged after a predetermined time elapses. As a result, parts of each video reel (four successive symbols in the present embodiment) are displayed for the player. In other words, one symbol is displayed in each of the four areas on the upper stage, the upper middle stage, the lower middle stage, and the lower stage in each column (each of the columns 211 to 215) of the symbol display area 21. To put it differently, 20 symbols forming a matrix with 5 columns and 4 rows are displayed in the symbol display area 21 (see FIG. 7).

The winning determination in the present embodiment is a payline type in which one of the upper, upper middle, lower middle, and lower stages of each column is selected and in which whether a win is achieved is determined based on a combination of rearranged symbols on a payline formed in the selected areas. For example, there are a payline formed of areas on the lower middle stages of all columns and a payline formed of an area on the upper stage of the column 211, an area on the upper middle stage of the column 212, an area on the lower middle stage of the column 213, an area on the upper middle stage of the column 214, and an area on the upper stage of the column 215. When three or more symbols of the same type are successively rearranged on such a payline across the columns 211 to 215 (this situation is equivalent to a situation in which symbols are successively displayed in the columns from one side toward the other side), a win is achieved (a payout is awarded). In regard to the number of paylines, while there are 30 paylines in the present embodiment, the number of paylines may be, e.g., 50.

The winning determination may be a "LEFT TO RIGHT" type. In the "LEFT TO RIGHT" type, assume that 20 symbols are rearranged in the symbol display area 21. In this case, when a predetermined number or more (3 to 5 in the present embodiment) symbols of the same type are successively arranged so as to form a lateral line across the columns 211 to 215 of the symbol display area 21, a win is achieved (a payout is awarded as a reward).

(Symbol Arrays of Video Reels)

The following will describe a configuration of symbol arrays included in the five video reels, which are displayed in the columns 211 to 215 of the symbol display area 21. In this regard, the video reels are stored in the storage unit 132 or the RAM 103.

Plural symbols are aligned in each of the five video reels (i.e., "REEL1" displayed at the column 211, "REEL2" displayed at the column 212, "REEL3" displayed at the column 213, "REEL4" displayed at the column 214, and "REEL5" displayed at the column 215). The types of the symbols arranged on each of the video reels include normal symbols such as "RED7", "BLUE7", "HEART", "WATERMELON", "BELL", "PLUM", "CHERRY" (equivalent to a third symbol), "A", "K", "Q", "J", "10", and "9", a "BONUS" symbol (equivalent to a first symbol) with which BONUS triggering the awarding of a free game is won, and a "WILD" symbol (equivalent to a second symbol) which is an almighty symbol that can substitute for any other symbol (except "BONUS" symbol). The "BONUS" symbol is a scatter symbol, and whether BONUS is won is determined based on the number (three or more) of "BONUS" symbols rearranged in the symbol display area 21.

(Paytable)

The storage unit 132 or the RAM 103 stores a paytable of the slot game. The paytable of the slot game defines a payout amount of each coin paid out (payout) with respect to a combination of symbols (arrangement patterns of symbols) with which a win is achieved. In the slot game, when scroll of the five video reels is stopped and three or more symbols of the same type are successively rearranged on a payline across the columns 211 to 215 of the symbol display area 21, a win is achieved (a payout is awarded). In accordance with the win, a payout is awarded to the player.

To be more specific, a "2000" payout is awarded when five "RED7" symbols are successively rearranged, a "400" payout is awarded when four "RED7" symbols are successively rearranged, and a "200" payout is awarded when three "RED7" symbols are successively rearranged. Furthermore, a "1500" payout is awarded when five "BLUE7" symbols are successively rearranged, a "300" payout is awarded when four "BLUE7" symbols are successively rearranged, and a "150" payout is awarded when three "BLUE7" symbols are successively rearranged. Furthermore, a "1000" payout is awarded when five "HEART" symbols are successively rearranged, a "200" payout is awarded when four "HEART" symbols are successively rearranged, and a "100" payout is awarded when three "HEART" symbols are successively rearranged. Furthermore, a "500" payout is awarded when five "WATERMELON" symbols are successively rearranged, a "100" payout is awarded when four "WATERMELON" symbols are successively rearranged, and a "50" payout is awarded when three "WATERMELON" symbols are successively rearranged. Furthermore, a "400" payout is awarded when five "BELL" symbols are successively rearranged, a "80" payout is awarded when four "BELL" symbols are successively rearranged, and a "40" payout is awarded when three "BELL" symbols are successively rearranged. Furthermore, a "250" payout is awarded when five "PLUM" symbols are successively rearranged, a "50" payout is awarded when four "PLUM" symbols are successively rearranged, and a "25" payout is awarded when three "PLUM" symbols are successively rearranged. Furthermore, a "100" payout is awarded when five "CHERRY" symbols are successively rearranged, a "20" payout is awarded when four "CHERRY" symbols are successively rearranged, and a "10" payout is awarded when three "CHERRY" symbols are successively rearranged. Furthermore, a "50" payout is awarded when five symbols of each of letter symbols such as "A", "K", "Q", "J", "10", and "9" are successively rearranged, a "10" payout is awarded when four symbols of each of letter symbols such as "A", "K", "Q", "J", "10", and "9" are successively rearranged, and a "5" payout is awarded when three symbols of each of letter symbols such as "A", "K", "Q", "J", "10", and "9" are successively rearranged.

[Contents of Program]

Figure 5:
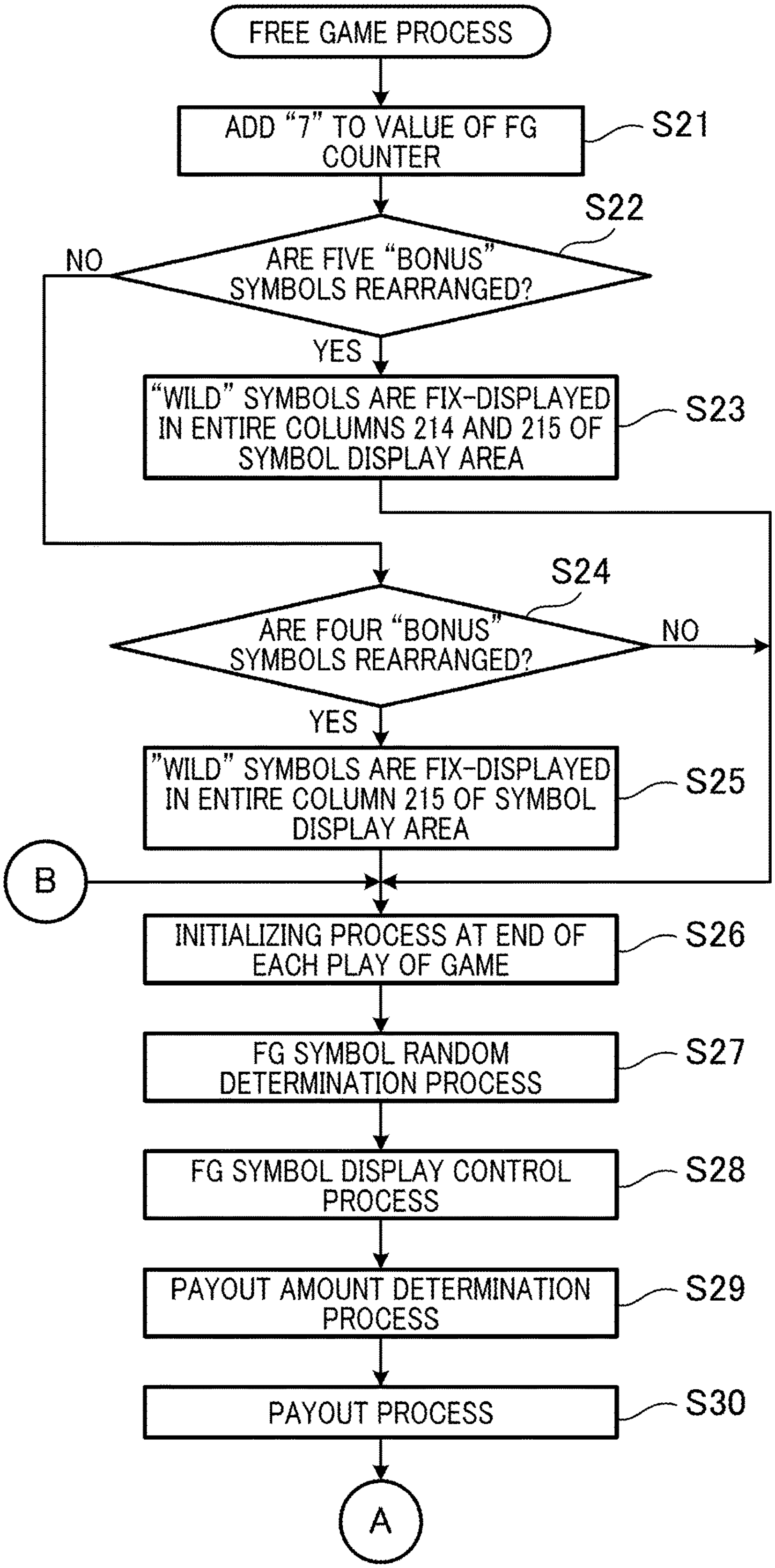
FIG. 5 is a flowchart of a free game process.
Figure 6:
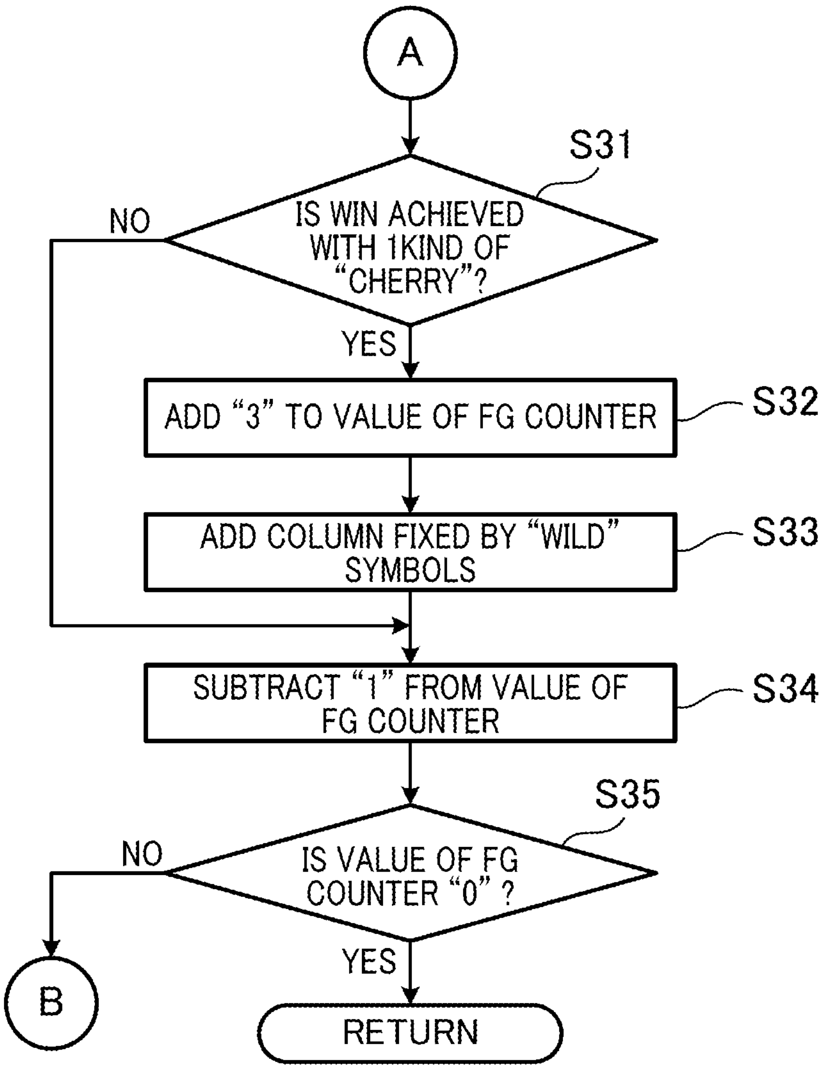
FIG. 6 is a flowchart of the free game process.

A program of the slot game executed by the smartphone 1 will be described with reference to FIG. 4 to FIG. 6.

(Normal Slot Game Control Process)

Figure 4:
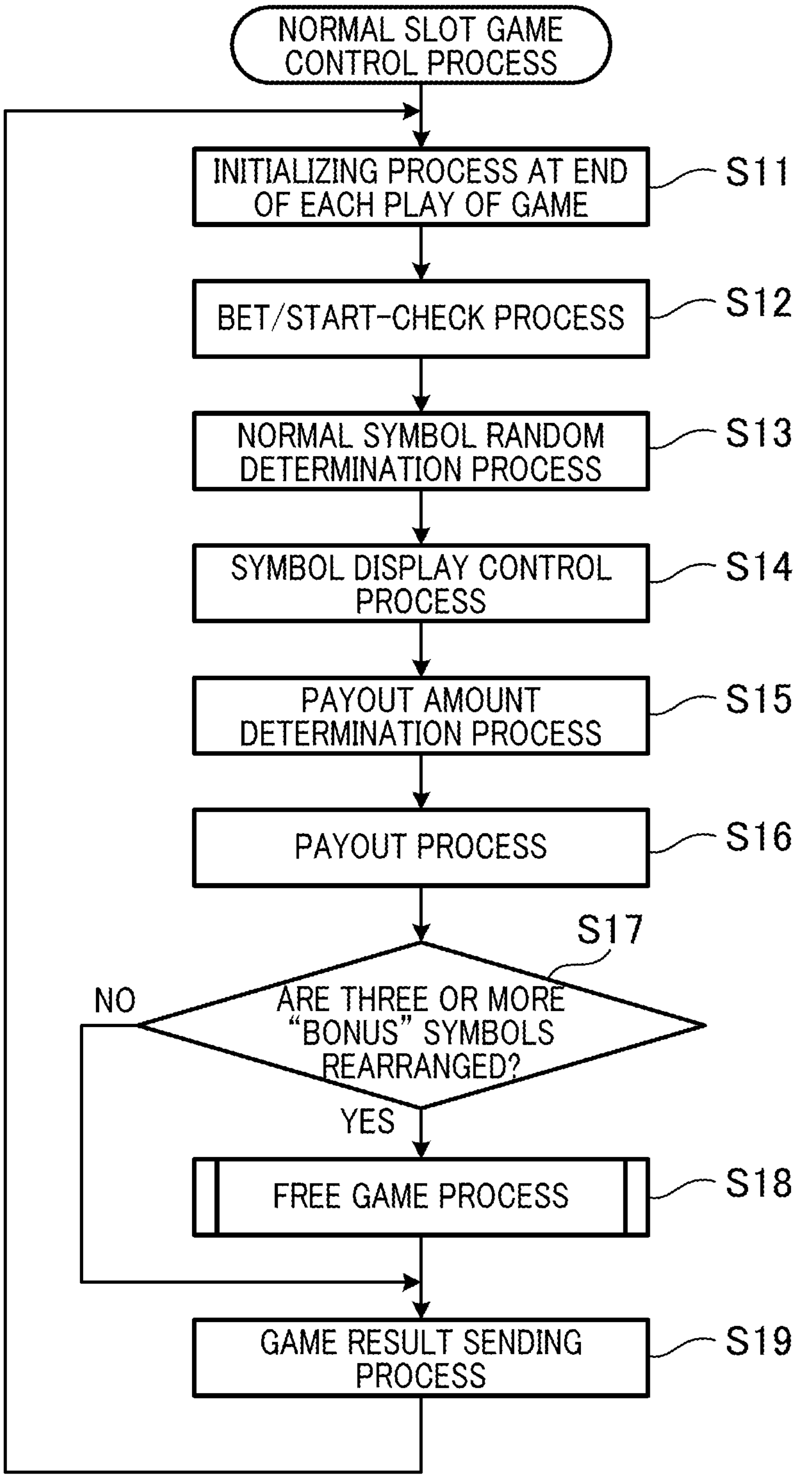
FIG. 4 is a flowchart of a normal slot game control process.

Referring to FIG. 4, a normal slot game control process will be described.

To begin with, the CPU 101 executes an initializing process at the end of each play of the game in order to start the slot game (S11). For example, this process clears data in a working area of the RAM 103, which becomes unnecessary at the end of each play of the unit game. Examples of the data include a payline activated in the previous execution of the unit game, the value on a bet amount counter in a bet amount storage area, and symbols to be displayed in the symbol display area 21 as a result of random determination.

Subsequently, the CPU 101 executes a bet/start-check process (S12). In this bet/start check process, which payline is activated is determined. By a touch input such as pressing of a "+" button and a "−" button (see FIG. 3) of the bet button 244 of the operation display area 24 on the display 120 of the smartphone 1, the total number of coins betted on a payline activated by a player is determined. In the present embodiment, because all 30 paylines are activated in a single execution of the unit game, the number of coins required for executing the unit game once is 30. Therefore, a bet multiplying factor multiplied by a payout for a win is calculated by the equation "(the total number of betted coins)/(the number of coins required for executing the unit game once)". For example, when the total number of betted coins is 300, the bet multiplying factor is ten (300/30=10). Furthermore, when the total number of betted coins is 1200, the bet multiplying factor is forty (1200/30=40). The total number of betted coins and the bet multiplying factor are then stored in a bet amount counter of the RAM 103. The bet multiplying factor corresponding to the total number of betted coins is determined in this way. As a result, when a win is achieved in the slot game, a payout awarded in the unit game equals to a value calculated by multiplying a payout corresponding to the win achieved on an activated payline by the bet multiplying factor. For example, on the respective two paylines, when (i) three "BELL" symbols (3Kinds) are successively rearranged and a win (payout: 40) is achieved, (ii) four "J" symbols (4Kinds) are successively rearranged and a win (payout: 10) is achieved, and (iii) the total number of betted coins is 300, the bet multiplying factor is ten and a payout awarded in the unit game equals to a value calculated by the equation "(40+10)×10=500".

In the bet/start-check process, furthermore, the CPU 101 determines whether a touch input has been made to the spin button 241. When a touch input has been made to the spin button 241, the slot game progresses as the routine proceeds to S13.

Subsequently, the CPU 101 executes a normal symbol random determination process (S13). In this process, by using the video reels, to-be-stopped symbols are randomly selected from symbols provided on the video reels ("REEL1", "REEL2", "REEL3", "REEL4", and "REEL5"). The to-be-stopped symbols are data of five symbols to be displayed on the lower middle stages of the columns 211 to 215 of the symbol display area 21, out of symbols forming the video reels. In this way, 20 symbols to be displayed in the symbol display area 21 are determined.

The CPU 101 then stores the determined five to-be-stopped symbols in a symbol storing area in the RAM 103.

Figure 7:
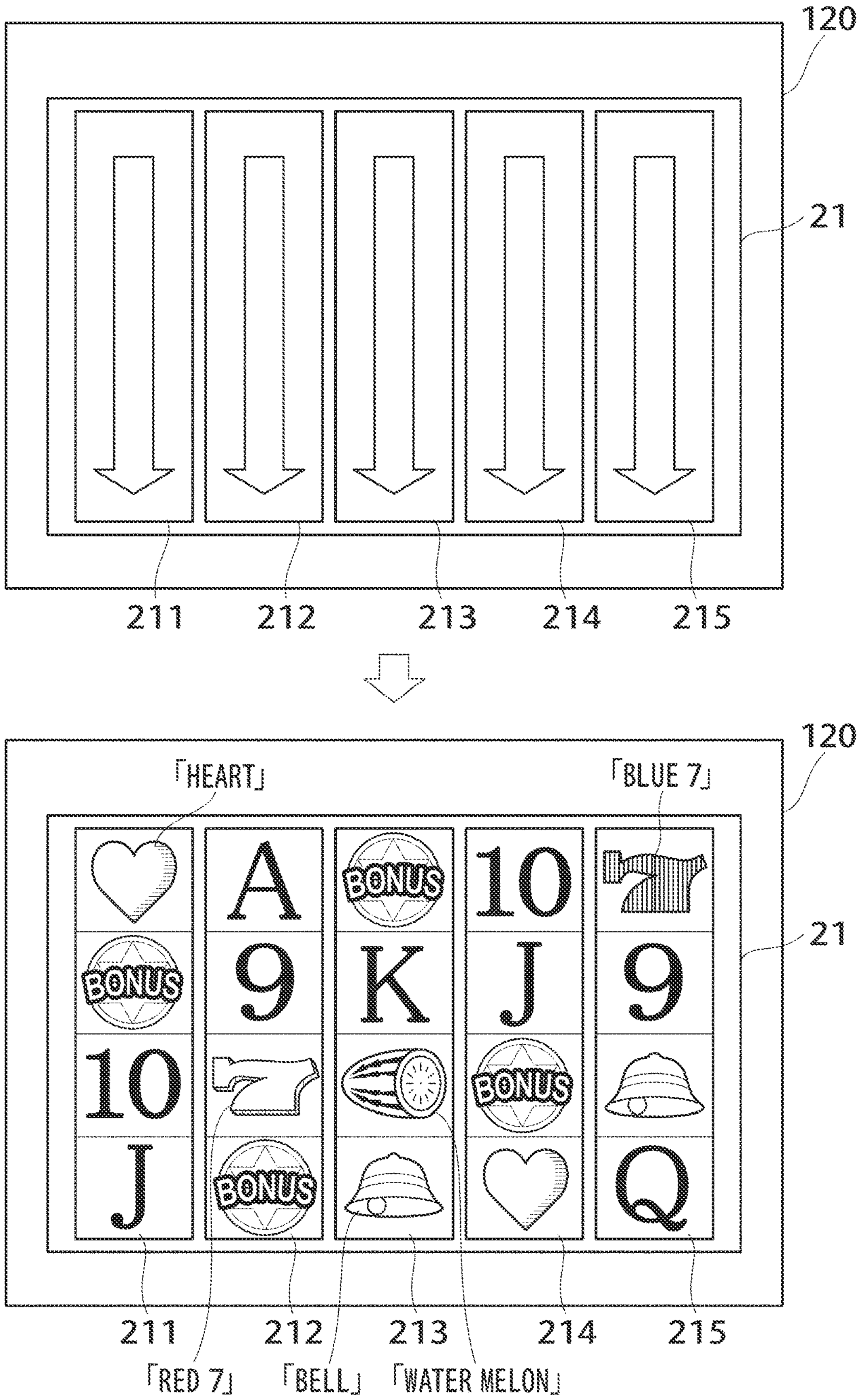
FIG. 7 illustrates a display screen of the slot game displayed on the smartphone.

Subsequently, the CPU 101 executes a symbol display control process (S14). In this symbol display control process, as shown in FIG. 7, scroll of the symbol arrays (REEL1, REEL2, REEL3, REEL4, and REEL5) of the video reels starts. After a predetermined time elapses, the five to-be-stopped symbols having been selected in the normal symbol random determination process in S13 are rearranged one by one on the lower middle stages of the column 211 to the column 215 of the symbol display area 21. In other words, the 20 symbols including the to-be-stopped symbols are rearranged in the symbol display area 21. For example, as described above, when a "10" symbol is selected as a to-be-stopped symbol in the REEL1, a "RED7" symbol is selected as a to-be-stopped symbol in the REEL2, a "WATERMELON" symbol is selected as a to-be-stopped symbol in the REEL3, a "BONUS" symbol is selected as a to-be-stopped symbol in the REEL4, and a "BELL" symbol is selected as a to-be-stopped symbol in the REEL5, the symbols "10", "RED7", "WATERMELON", "BONUS", and "BELL" are respectively provided on the lower middle stages of the column 211 to the column 215 of the symbol display area 21 (see FIG. 7). On the upper stage, upper middle stage, and lower stage of each of the column 211 to the column 215 of the symbol display area 21, symbols arranged above and below each to-be-stopped symbol are rearranged (see FIG. 7).

Subsequently, the CPU 101 executes a payout amount determination process (S15). In this process, whether three or more symbols of the same type are successively rearranged on the payline across the columns 211 to 215 so that a win is achieved is determined based on the paytable stored in the RAM 103. When the win is achieved, a payout is awarded in accordance with a type of the win. The payout awarded is stored in a payout amount storage area provided in the RAM 103.

For example, when three "RED7" symbols are successively rearranged on an activated payline across the column 211 to the column 213 and a win is achieved with the 3Kinds of "RED7", the paytable is referred to, a payout is determined to be 200 coins (when the number of betted coins is 1), and the determined payout is stored in the payout amount storage area of the RAM 103.

Subsequently, the CPU 101 executes a payout process (S16). The CPU 101 adds a value stored in the payout amount storage area of the RAM 103 to a value of a coin counter in the RAM 103. For example, when "200" has been stored in the payout amount storage area in the payout amount determination process in S15, "200" is added to the value of the coin counter.

Subsequently, the CPU 101 determines whether three or more "BONUS" symbols are rearranged in the symbol display area 21 and "BONUS" is won (S17). When the "BONUS" win is achieved (YES in S17), the routine proceeds to a free game process (S18). As detailed later, the free game process allows the player to play the slot game seven times without the consumption of coins. For example, when four "BONUS" symbols are rearranged in the symbol display area 21 as shown in FIG. 7, a win is achieved with the 4Kinds of "BONUS" and the routine proceeds to the free game process.

Meanwhile, when the "BONUS" win is not achieved (NO in S17) or after S18, the CPU 101 executes a game result sending process (S19). In this game result sending process, results of the execution of the slot game once (unit game) are sent to the server 100 as game result information. The results are, e.g., the number of coins having been betted in S12 (the value of a bet counter in the RAM 103), the to-be-stopped symbols having been determined in the normal symbol random determination process in S13 (i.e., 20 symbols displayed in the symbol display area 21), the type of the win having been achieved in the payout amount determination process in S15 (including a failure), and the value of the coin counter having been updated in the payout process in S16 (i.e., the number of coins owned). In this regard, the game result sending process is performed so that the smartphone 1 and the server 100 share the progress, result, and the like of the slot game, in order to prevent cheating and unfairness and to backup the progress of the slot game executed in the smartphone 1. Therefore, the game result sending process may be executed after the execution of a predetermined process, executed at predetermined time intervals, or executed at a timing set by a player or an administrator of the server 100.

After the step S19, the routine goes back to S11.

(Free Game Process)

The free game process will be described with reference to FIG. 5 and FIG. 6. This free game process is executed when it is determined in the normal slot game control process in S17 that the "BONUS" is won.

Figure 8:
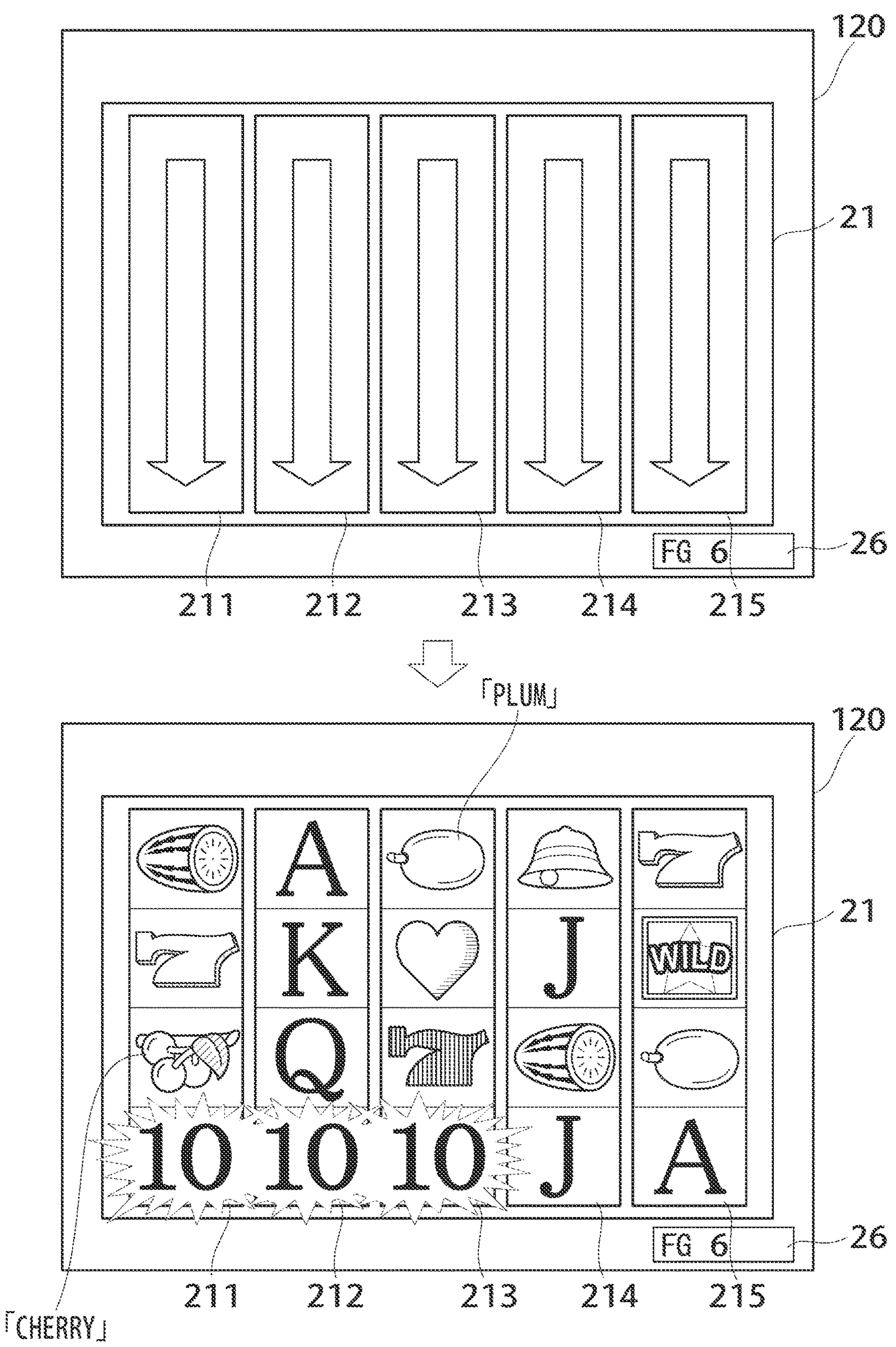
FIG. 8 illustrates a display screen of the slot game displayed on the smartphone.

To begin with, the CPU 101 adds "7" to a value of an FG counter of the RAM 103 (S21). At this time, as shown in FIG. 8, a number indicating the remaining number of executions of a free game is displayed in an FG number display area 26 of the display 120. For example, as shown in FIG. 8, when the free game which is to be executed seven times is being executed first time, the FG number display area 26 displays "6" as the remaining number of executions of the free game.

Figure 10:
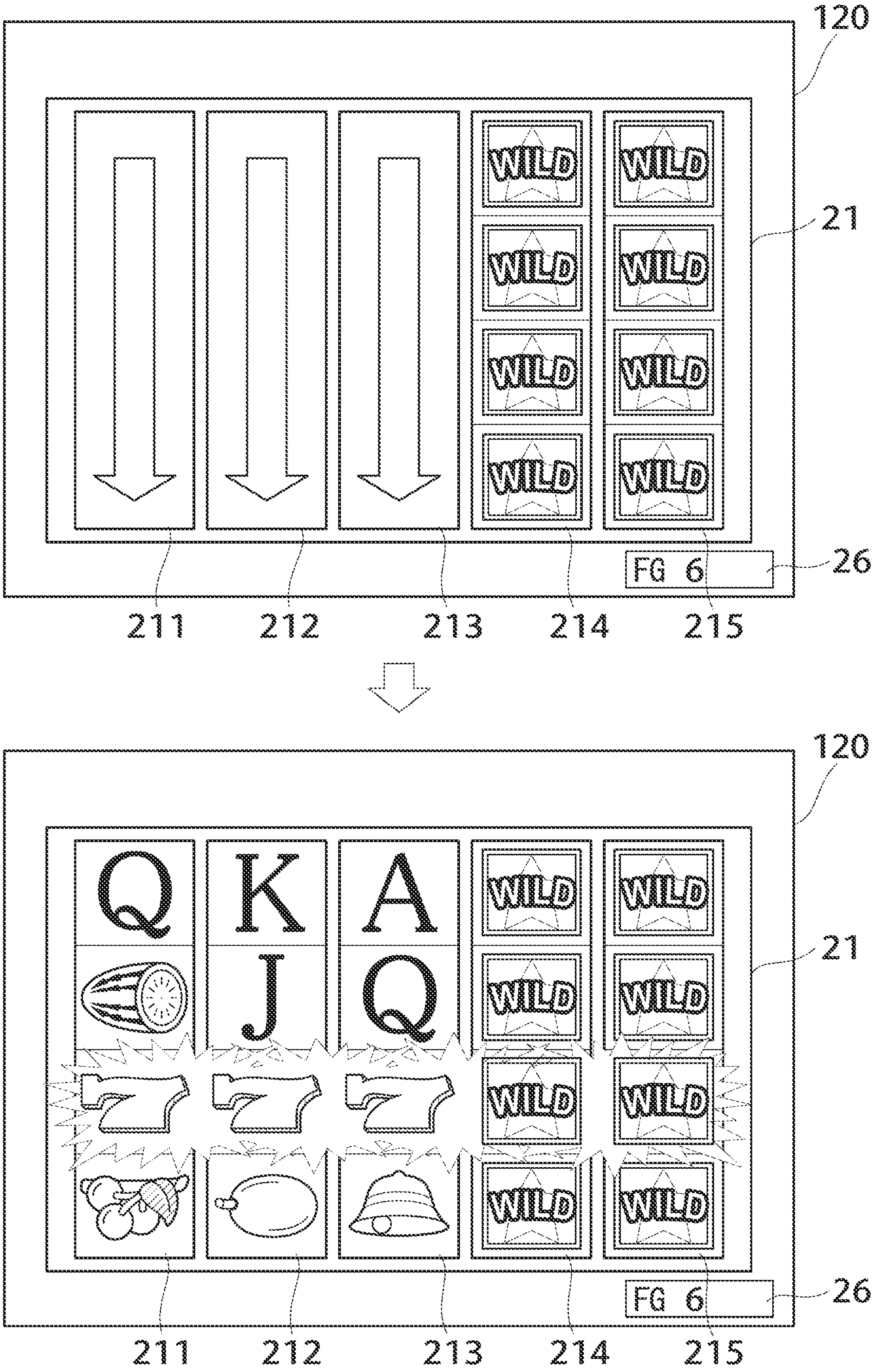
FIG. 10 illustrates a display screen of the slot game displayed on the smartphone.

Subsequently, the CPU 101 determines whether five "BONUS" symbols are rearranged in the symbol display area 21 (S22). In other words, whether the win has been achieved with the 5Kinds of "BONUS" in the normal slot game control process in S17 is determined. When the win has been achieved with the 5Kinds of "BONUS" (YES in S22), the CPU 101 fix-displays "WILD" symbols in the entire column 214 (on the upper, upper middle, lower middle, and lower stages) and the entire column 215 (on the upper, upper middle, lower middle, and lower stages) of the symbol display area 21 as shown in FIG. 10 (S23).

Figure 9:
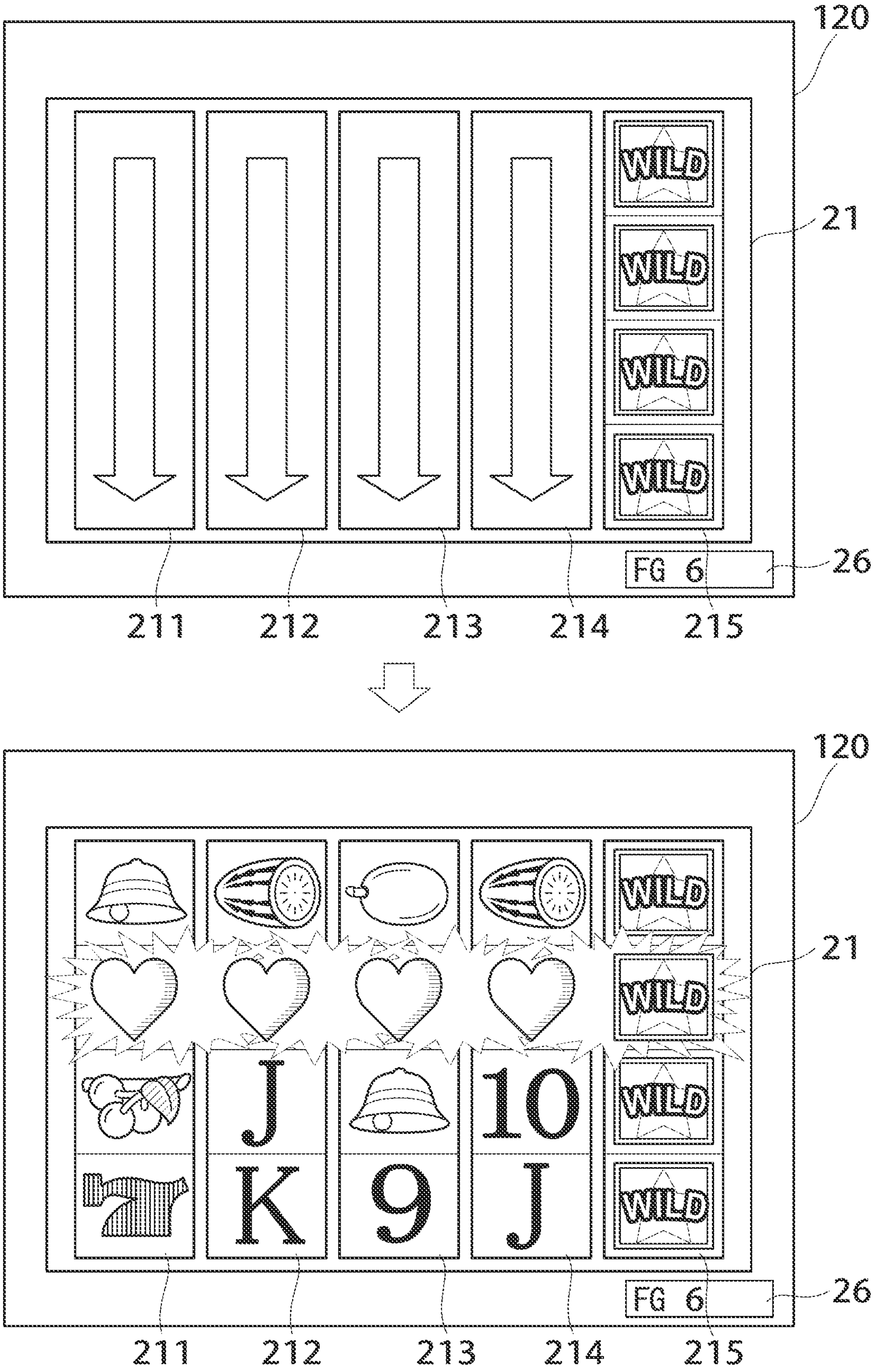
FIG. 9 illustrates a display screen of the slot game displayed on the smartphone.

Meanwhile, when the win has not been achieved with the 5Kinds of "BONUS" (NO in S22), the CPU 101 determines whether four "BONUS" symbols are rearranged in the symbol display area 21 (S24). In other words, whether the win has been achieved with the 4Kinds of "BONUS" in the normal slot game control process in S17 is determined. When the win has been achieved with the 4Kinds of "BONUS" (YES in S24; see FIG. 7), the CPU 101 fix-displays "WILD" symbols in the entire column 215 (on the upper, upper middle, lower middle, and lower stages) of the symbol display area 21 as shown in FIG. 9 (S25).

When it is determined in the step S24 that the win has not been achieved with the 4Kinds of "BONUS" (NO in S24), it is determined that the win has been achieved with the 3Kinds of "BONUS" in the normal slot game control process in S17.

After the step S23, after the step S25, or when the win has not been achieved with the 4Kinds of "BONUS" (NO in S24), the CPU 101 performs the initializing process at the end of each play of the game in the same manner as in S11 in order so start the slot game which is the free game (S26).

In the free game process, the (30) paylines activated in the normal slot game and the number of betted coins in the normal slot game remain the same. The CPU 101 determines whether a touch input has been made to the spin button 241. When a touch input has been made to the spin button 241, the slot game progresses as the routine proceeds to S27.

Subsequently, the CPU 101 executes an FG symbol random determination process (S27). When it is determined in the step S22 that the win has been achieved with the 5Kinds of "BONUS", the "WILD" symbols are fix-displayed in the entire column 214 (on the upper, upper middle, lower middle, and lower stages) and the entire column 215 (on the upper, upper middle, lower middle, and lower stages) in the symbol display area 21. Therefore, in the FG symbol random determination process, three to-be-stopped symbols are randomly selected out of symbols arranged on three video reels ("REEL1", "REEL2", and "REEL3"). These three determined to-be-stopped symbols are data of three symbols to be displayed on the lower middle stages of the columns 211 to 213 of the symbol display area 21.

When it is determined in the step S24 that the win has been achieved with the 4Kinds of "BONUS", the "WILD" symbols are fix-displayed in the entire column 215 (on the upper, upper middle, lower middle, and lower stages) of the symbol display area 21. Therefore, in the FG symbol random determination process, four to-be-stopped symbols are randomly selected out of symbols arranged on four video reels ("REEL1", "REEL2", "REEL3", and "REEL4"). These four determined to-be-stopped symbols are data of four symbols to be displayed on the lower middle stages of the columns 211 to 214 of the symbol display area 21.

Assume that it is determined in the step S24 that the win has been achieved with the 3Kinds of "BONUS" (NO in S24). In this case, in the FG symbol random determination process, five to-be-stopped symbols are randomly selected out of symbols arranged on five video reels ("REEL1", "REEL2", "REEL3", "REEL4", and "REEL5"). These five determined to-be-stopped symbols are data of five symbols to be displayed on the lower middle stages of the columns 211 to 215 of the symbol display area 21.

The CPU 101 then stores the determined to-be-stopped symbols in a symbol storing area in the RAM 103.

Subsequently, the CPU 101 executes an FG symbol display control process (S28). When it is determined in the step S22 that the win has been achieved with the 5Kinds of "BONUS", the "WILD" symbols are fix-displayed in the entire column 214 (on the upper, upper middle, lower middle, and lower stages) and the entire column 215 (on the upper, upper middle, lower middle, and lower stages) in the symbol display area 21. Therefore, in the FG symbol display control process, the scroll of the three video reels ("REEL1", "REEL2", and "REEL3") starts as shown in FIG. 10. Subsequently, after a predetermined time elapses, the three to-be-stopped symbols having been selected in the FG symbol random determination process in S27 are rearranged one by one on the lower middle stages of the column 211 to the column 213 in the symbol display area 21. In other words, 20 symbols including the "WILD" symbols fix-displayed in the entire column 214 and the entire column 215 are rearranged in the symbol display area 21. For example, when a "RED7" symbol is selected as a to-be-stopped symbol in the REEL1, a "RED7" symbol is selected as a to-be-stopped symbol in the REEL2, and a "RED7" symbol is selected as a to-be-stopped symbol in the REEL3, the symbols "RED7", "RED7", and "RED7" are respectively rearranged (see FIG. 10) on the lower middle stages of the column 211 to the column 213 of the symbol display area 21.

When it is determined in the step S24 that the win has been achieved with the 4Kinds of "BONUS", the "WILD" symbols are fix-displayed in the entire column 215 (on the upper, upper middle, lower middle, and lower sages) of the symbol display area 21. Therefore, in the FG symbol display control process, the scroll of the four video reels ("REEL1", "REEL2", "REEL3", and "REEL4") starts as shown in FIG. 9. Subsequently, after a predetermined time elapses, the four to-be-stopped symbols having been selected in the FG symbol random determination process in S27 are rearranged one by one on the lower middle stages of the column 211 to the column 214 in the symbol display area 21. In other words, 20 symbols including the "WILD" symbols fix-displayed in the entire column 215 are rearranged in the symbol display area 21. For example, when a "CHERRY" symbol is selected as a to-be-stopped symbol in the REEL1, a "J" symbol is selected as a to-be-stopped symbol in the REEL2, a "BELL" symbol is selected as a to-be-stopped symbol in the REEL3, and a "10" symbol is selected as a to-be-stopped symbol in the REEL4, the symbols "CHERRY", ""J, "BELL", and "10" are rearranged (see FIG. 9) on the lower middle stages of the column 211 to the column 214 in the symbol display area 21.

Assume that it is determined in the step S24 that the win has been achieved with the 3Kinds of "BONUS" (NO in S24). In this case, in the FG symbol display control process, the scroll of the five video reels ("REEL1", "REEL2", "REEL3", "REEL4", and "REEL5") starts as shown in FIG. 8. Subsequently, after a predetermined time elapses, the five to-be-stopped symbols having been selected in the FG symbol random determination process in S27 are rearranged one by one on the lower middle stages of the column 211 to the column 215 in the symbol display area 21. In other words, 20 symbols including the to-be-stopped symbols are rearranged (see FIG. 8) in the symbol display area 21.

Subsequently, the CPU 101 executes a payout amount determination process (S29). In this process, whether three or more symbols of the same type are successively rearranged on the payline across the column 211 to the column 215 and a win is achieved is determined based on the paytable stored in the RAM 103. When the win is achieved, a payout is awarded in accordance with a type of the win. The payout awarded is stored in the payout amount storage area in the RAM 103.

For example, as shown in FIG. 10, when five "RED7" symbols (including one or more "WILD" symbols) are rearranged across the column 211 to the column 215 on a payline formed of the lower middle stages of the columns 211 to 215 and a win is achieved with the 5Kinds of "RED7", the above-described paytable is referred to, a payout is determined to be a value calculated by multiplying the bet multiplying factor by 2000, and the determined payout is stored in the payout amount storage area provided in the RAM 103.

For example, as shown in FIG. 9, when five "HEART" symbols (including one or more "WILD" symbols) are rearranged across the column 211 to the column 215 on a payline formed of the lower middle stages of the columns 211 to 215 and a win is achieved with the 5Kinds of "HEART", the above-described paytable is referred to, a payout is determined to be a value calculated by multiplying the bet multiplying factor by 1000, and the determined payout is stored in the payout amount storage area provided in the RAM 103.

Subsequently, the CPU 101 executes a payout process (S30). The CPU 101 adds a value stored in the payout amount storage area of the RAM 103 to the value of the coin counter in the RAM 103. For example, when "2000" has been stored in the payout amount storage area in the payout amount determination process in S29, "2000" is added to the coin counter.

Subsequently, the CPU 101 determines whether the 1Kind of "CHERRY" is achieved (S31). In other words, whether a "CHERRY" symbol is rearranged on any stage of the column 211 (on the upper, upper middle, lower middle, or lower stage) of the symbol display area 21 and no "CHERRY" symbol is rearranged on the column 212 in the symbol display area 21 is determined (see FIG. 9).

When the 1Kind of "CHERRY" is achieved (YES in S31), the CPU 101 adds "3" to the value of the FG counter of the RAM 103 (S32). At this time, "3" is added to the remaining number of executions of the free game, which is displayed in the FG number display area 26 of the display 120.

Subsequently, the CPU 101 adds a column fixed by "WILD" symbols (S33). For example, assume that it is determined in the step S24 that the win has been achieved with the 3Kinds of "BONUS" (NO in S24). In this case, a state in which no column is fixed by "WILD" symbols is changed to a state in which "WILD" symbols are fix-displayed (see FIG. 9) in the entire column 215 (on the upper, upper middle, lower middle, and lower stages) of the symbol display area 21. In other words, when no "WILD" symbol is fix-displayed in any column, "WILD" symbols are to be fix-displayed in the entire column 215.

For example, assume that it is determined in the step S24 that the win has been achieved with the 4Kinds of "BONUS" (YES in S24). In this case, a state in which "WILD" symbols are fix-displayed in the entire column 215 (on the upper, upper middle, lower middle, and lower stages) of the symbol display area 21 is changed to a state in which "WILD" symbols are fix-displayed (see FIG. 10) in the entire column 214 (on the upper, upper middle, lower middle, and lower stages) of the symbol display area 21 in addition to the entire column 215. In other words, when "WILD" symbols are fix-displayed in the entire column 215, "WILD" symbols are to be fix-displayed in the entire column 214 in addition to the entire column 215.

For example, assume that it is determined in the step S22 that the win has been achieved with the 5Kinds of "BONUS" (YES in S22). In this case, a state in which "WILD" symbols are fix-displayed in the entire column 214 (on the upper, upper middle, lower middle, and lower stages) and the entire column 215 (on the upper, upper middle, lower middle, and lower stages) remains the same (see FIG. 10). In other words, when "WILD" symbols are fix-displayed in the entire column 214 and the entire column 215, no column is to be additionally fixed by "WILD" symbols.

Because of this, each time a win is achieved with the 1Kind of "CHERRY", "WILD" symbols are fix-displayed in the entire column 215 or the entire column 214. Therefore, not only when a win is achieved with "BONUS", but also when a "CHERRY" symbol is rearranged in the symbol display area 21 and a win is achieved with the 1Kind of "CHERRY", "WILD" symbols can be fix-displayed in the entire column 215 or the entire column 214.

Subsequently, after the step S33 or when it has been determined that the win is not achieved with the 1Kind of "CHERRY" in the step S31 (NO in S31), the CPU 101 subtracts "1" from the value of the FG counter of the RAM 103 (S34).

Subsequently, the CPU 101 determines whether the value of the FG counter of the RAM 103 is "0" (S35). When the value of the FG counter is not 0 (NO in S35), the routine goes back to S26.

When the value of the FG counter is 0 (YES in S35), the CPU 101 terminates the routine.

With the arrangement above, as a result of the normal symbol random determination process in S13, when four or more "BONUS" symbols are displayed in the symbol display area 21 in which the five columns 211 to 215 and the four stages (upper, upper middle, lower middle, and lower stages) intersect with one another in a matrix manner, "WILD" symbols are fix-displayed in accordance with the number of columns which corresponds to the number of the displayed "BONUS" symbols. In the free game, while the "WILD" symbols are fix-displayed in those corresponding columns, symbols having been determined in the FG symbol random determination process in S27 are displayed in other columns. As a result, a payout is awarded in accordance with a combination of some of the symbols including the "WILD" symbols fix-displayed in those corresponding columns.

Therefore, when four or more "BONUS" symbols are displayed in the symbol display area 21, "WILD" symbols are fix-displayed both in the column 214 and the column 215 or fix-displayed only in the column 215 in the free game. This allows a player to easily recognize the increase of probability of achievement of a winning symbol combination including at least one "WILD" symbol.

With the arrangement above, in the normal slot game control process, when the number of "BONUS" symbols displayed in the symbol display area 21 is four, "WILD" symbols are fix-displayed in the entire column 215 provided on the other side. Meanwhile, when the number of "BONUS" symbols displayed in the symbol display area 21 is five, "WILD" symbols are fix-displayed in the entire column 215 and the column 214 which are provided on the other side. In other words, settings are performed so that the number of one or more of the columns 211 to 215 increases in order from the last column 215 toward the column 211 and in accordance with the number of "BONUS" symbols displayed in the symbol display area 21. In the one or more of the columns, "WILD" symbols are fix-displayed. This regularizes the order of columns in which "WILD" symbols are fix-displayed, and thus a player is able to easily recognize the order of columns.

In the normal slot game control process, when four "BONUS" symbols are displayed in the symbol display area 21, "WILD" symbols are fix-displayed in the entire column 215 in the free game. As a result, only four video reels are scrolled and the rearrangement is performed for the four video reels. Because of this, in the free game, the number of video reels which are scrolled and for which the rearrangement is performed is smaller than that of the normal slot game (five columns minus one column (i.e., the number of fixed columns) equals four columns). It is therefore possible to increase the speed of finishing execution of the unit game. In the normal slot game control process, when five "BONUS" symbols are displayed in the symbol display area 21, "WILD" symbols are fix-displayed in the entire column 214 and the entire column 215 in the free game. As a result, only three video reels are scrolled and the rearrangement is performed for the three video reels. Because of this, in the free game, the number of video reels which are scrolled and for which the rearrangement is performed is smaller than that of the normal slot game (five columns minus two columns (the number of fixed columns) equals three columns). It is therefore possible to increase the speed of finishing execution of the unit game. As such, by increasing the speed of finishing execution of the unit game, a result (how much an awarded payout is) of the free game in which the unit game is executed plural times (seven times in the present embodiment) is provided relatively early during the free game.

Other Embodiments

The slot game in the embodiment above may be, as game software (a program and game data), installed in and executed by an information processor. Examples of the information processor include mobile information devices such as a smartphone, a portable computer, a laptop computer, a note PC, a tablet PC, a handheld PC, and a PDA (Personal Data Assistant). The game software by which the slot game is executed is downloaded from a server or the like via communication means, and stored in a storage device (e.g., a flash memory) in a mobile information device. The communication means may be an interactive communication passage such as the Internet and a cable TV, or may be one-way broadcasting.

The game software by which the slot game is executed may be stored in a recording medium such as a CD-ROM, a DVD-ROM, an MO (optical magnetic disc), a hard disk, and a flash memory, and may be read from the recording medium and installed in a storage device of an information processor such as the server 100 and the smartphone 1, according to need.

The disclosure of the embodiment above may be embodied as a game program which is executed between each smartphone 1 and the server 100 over the Internet (communication line). In this case, the game program may be stored in a recording medium such as a CD-ROM, a DVD-ROM, an MO (optical magnetic disc), a hard disk, and a flash memory, and may be read from the recording medium according to need.

The processes executed in the embodiment above may be a game program installed in the smartphone 1. The game program may be stored in a recording medium (medium).

An embodiment of the present invention thus described above solely serves as a specific example of the present invention, and is not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

REFERENCE SIGNS LIST

1 smartphone
5 touch panel
21 symbol display area
24 operation display area
100 server
101 CPU
102 ROM
103 RAM
104 flash memory
120 display
131 control unit
132 storage unit

The invention claimed is:

1. An information processor comprising:

a display device configured to display a symbol display area in which columns and stages are arranged to intersect with one another in a matrix manner; and a controller; and a memory configured to store a program which when executed by the controller, causes the controller to execute processes (1a) to (1e) as a unit game, the program being configured to:

(1a) cause the controller to randomly determine symbols to be stopped and displayed in the symbol display area of the display device, the symbols including at least one first symbol;

(1b) cause the controller to stop and display the symbols, which are determined by the process (1a), in the symbol display area after being varied and displayed in the symbol display area;

(1c) cause the controller to award a payout in accordance with a combination of the symbols, which are stopped and displayed in the symbol display area, after the process (1b);

(1d) cause the controller to fix-display second symbols in all symbol areas of one or more first columns among the columns of the symbol display area, a rule that the one or more first columns in which the second symbols are fix-displayed include a last column at an edge of the symbol display area among the columns regardless of a position of the at least one first symbol being used, the columns of the symbol display area including the one or more first columns and second columns, the second symbols being different from the at least one first symbol, and the number of the one or more first columns corresponding to the number of first symbols stopped and displayed in the symbol display area by the process (1b); and (1e) cause the controller to perform next execution of the unit game by using the symbol display area in which the second symbols are fix-displayed by the process (1d), wherein the program is further configured to, when a third symbol is stopped and displayed in the symbol display area in the next execution of the process (1e), cause the controller to further fix-display the second symbols in all symbol areas of one of the second columns and perform subsequent execution of the next execution while fix-displaying the second symbols in the all symbol areas of the one or more first columns and the all symbol areas of the one of the second columns, the third symbol being different from the at least one first symbol and the second symbols.

2. The information processor according to claim 1, wherein the display device is further configured to display a free game number display area configured to display a number of remaining free games, a number of free games being determined based on a predetermined condition being satisfied, and wherein the program is further configured to cause the controller to maintain a state in which the second symbols are fix-displayed by the process (1d) in a free game corresponding to a next unit game until the number of remaining free games displayed in the free game number display area reaches zero.

3. The information processor according to claim 2, wherein the program is further configured to cause the controller to rearrange the symbols by scrolling only a column in which the second symbols are not fix-displayed.

4. The information processor according to claim 1, wherein the last column is a column that is used last among the columns when the controller determines whether to award the payout.

5. An information processor comprising:

a display device configured to display a symbol display area in which columns and stages are arranged to intersect with one another in a matrix manner; and a controller; and a memory configured to store a program which when executed by the controller, causes the controller to execute processes (1a) to (1e) as a unit game, the program being configured to:

(1a) cause the controller to randomly determine symbols to be displayed in the symbol display area of the display device, the symbols including at least one first symbol;

(1b) cause the controller to display the symbols, which are determined by the process (1a), in the symbol display area;

(1c) cause the controller to award a payout in accordance with a combination of the symbols, which are displayed in the symbol display area, after the process (1b);

(1d) cause the controller to fix-display second symbols in all symbol areas of one or more columns among the columns of the symbol display area, the second symbols being different from the at least one first symbol, and the number of the one or more columns corresponding to the number of first symbols displayed in the symbol display area by the process (1b); and (1e) cause the controller to perform next execution of the unit game by using the symbol display area in which the second symbols are fix-displayed by the process (1d), wherein, in the process (1c), the payout is awarded in accordance with the combination of the symbols which are successively displayed in the columns from one side toward the other side in the symbol display area, in the process (1d), the second symbols are fix-displayed in the one or more columns and the number of the one or more columns increases in order from the other side and in accordance with the number of the first symbols displayed in the symbol display area by the process (1b), and in the process (1d), the second symbols are fix-displayed in a last column among the columns arranged from the one side toward the other side when the number of the first symbols displayed in the symbol display area is a predetermined number, and the second symbols are fix-displayed in last two columns among the columns arranged from the one side toward the other side when the number of the first symbols displayed in the symbol display area is greater than the predetermined number.

6. The information processor according to claim 5, wherein in the process of (1c), the payout is awarded in accordance with the combination of the symbols which are successively displayed in the columns from one side toward the other side on a payline of the symbol display area, and wherein the payline is a line formed by selecting one of a plurality of stages in each of the columns and connecting stages selected in the columns.

7. A game control method comprising causing a controller included in an information processor to execute processes (2a) to (2f) as a unit game, the information processor further including a display device configured to display a symbol display area in which columns and stages are arranged to intersect with one another in a matrix manner, wherein causing the controller to execute the processes (2a) to (2e) as the unit game comprises:

(2a) causing the controller to randomly determine symbols to be stopped and displayed in the symbol display area of the display device, the symbols including at least one first symbol;

(2b) causing the controller to stop and display the symbols, which are determined by the process (2a), in the symbol display area after being varied and displayed in the symbol display area;

(2c) causing the controller to award a payout in accordance with a combination of the symbols, which are stopped and displayed in the symbol display area, after the process (2b);

(2d) causing the controller to fix-display second symbols in all symbol areas of one or more first columns among the columns of the symbol display area, a rule that the one or more first columns in which the second symbols are fix-displayed include a last column at an edge of the symbol display area among the columns regardless of a position of the at least one first symbol being used, the columns of the symbol display area including the one or more first columns and second columns, the second symbols being different from the at least one first symbol, and the number of the one or more first columns corresponding to the number of first symbols stopped and displayed in the symbol display area by the process (2b); and (2e) causing the controller to perform next execution of the unit game by using the symbol display area in which the second symbols are fix-displayed by the process (2d), wherein the game control method further comprises, when a third symbol is stopped and displayed in the symbol display area in the next execution of the process (2e), causing the controller to further fix-display the second symbols in all symbol areas of one of the second columns and perform subsequent execution of the next execution while fix-displaying the second symbols in the all symbol areas of the one or more first columns and the all symbol areas of the one of the second columns, the third symbol being different from the at least one first symbol and the second symbols.

8. The game control method according to claim 7, wherein the display device is further configured to display a free game number display area configured to display a number of remaining free games, a number of free games being determined based on a predetermined condition being satisfied, and wherein causing the controller to fix-display the second symbols includes causing the controller to maintain a state in which the second symbols are fix-displayed by the process (2d) in a free game corresponding to a next unit game until the number of remaining free games displayed in the free game number display area reaches zero.

9. The game control method according to claim 8, wherein causing the controller to maintain the state includes causing the controller to rearrange the symbols by scrolling only a column in which the second symbols are not fix-displayed.

10. The game control method according to claim 7, wherein the last column is a column that is used last among the columns when the controller determines whether to award the payout.

* * * * *